(12) United States Patent
Kato

(10) Patent No.: US 6,197,458 B1
(45) Date of Patent: Mar. 6, 2001

(54) COLOR FILTER, PRODUCTION PROCESS THEREOF, AND LIQUID CRYSTAL DISPLAY PANEL USING THE COLOR FILTER

(75) Inventor: Naoki Kato, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/207,024

(22) Filed: Dec. 8, 1998

(30) Foreign Application Priority Data

Dec. 12, 1997 (JP) .................................................... 9-342496

(51) Int. Cl.⁷ ............................. G02B 5/20; G02F 1/1335
(52) U.S. Cl. ............................. 430/7; 347/106; 349/106; 427/164; 427/203
(58) Field of Search ............................. 430/7; 344/106; 347/106, 107, 1; 427/162, 164, 169, 197, 199, 203, 271, 355, 430.1

(56) References Cited

FOREIGN PATENT DOCUMENTS

| 4-086801 | * 3/1992 | (JP) . |
| 8313719 | 11/1996 | (JP) . |

* cited by examiner

*Primary Examiner*—John A. McPherson
(74) *Attorney, Agent, or Firm*—Fitzpatrick, Cella, Harper & Scinto

(57) ABSTRACT

Disclosed herein is a color filter comprising a substrate, a light-shielding layer having apertures provided on the substrate, and a patterned color filter layer formed by coloring an ink-receiving layer within each of the apertures, wherein the ink-receiving layer is composed of a solid particle layer, and almost the whole top surface of the light-shielding layer is exposed.

17 Claims, 6 Drawing Sheets

COLOR FILTER, PRODUCTION PROCESS THEREOF, AND LIQUID CRYSTAL DISPLAY PANEL USING THE COLOR FILTER

BACKGROUND OF THE INVENTION

1. Field of the Invention

The present invention relates to a color filter suitable for use in color display devices and a production process thereof, and particularly to a color filter suitable for use in color liquid crystal display devices used in color televisions, car televisions and personal computers, a production process thereof, and a liquid crystal display panel using the color filter.

2. Related Background Art

With the advancement of personal computers, particularly, portable personal computers in recent years, the demand for liquid crystal display devices, particularly, color liquid crystal display devices increases. It is however essential to reduce their cost and moreover to make their performance such as contrast and color reproducibility high for further spreading them.

Color filters used in liquid crystal display devices and the like have heretofore been mainly produced by a pigment dispersing process. In this process, it is necessary to uniformly coat a substrate with a resist, in which a pigment has been dispersed, by spin coating or the like, print a pattern thereon by means of an aligner and further etch unnecessary portions by a wet process. Therefore, this process cannot help going through a highly complicated process. In order to produce a color filter composed of 3 colors, this process must be repeated at least 3 times. Therefore, it takes very lengthy line and process time to produce the filter, which has placed hurdles on the road to reduction in cost.

From the viewpoint of the quality of a color filter, in the case of a color filter according to the general pigment dispersing process, it has been necessary to form the color filter in such a manner that a color filter pattern is laid on top of a light-shielding layer from the point of patterning precision in the process. Therefore, the flatness of the resulting substrate becomes low, which may have formed the cause of defective alignment or the like upon the formation of a liquid crystal cell in some cases.

As a means for solving this problem, there has been proposed a process for producing a color filter by using an ink-jet system. According to this process, an ink-receiving layer formed on the whole surface of a base can be colored on a predetermined pattern composed of a plurality of colors at once, so that great reduction in cost can be attempted. However, color filters are expected to further reduce their cost.

Japanese Patent Application Laid-Open No. 8-313719 has proposed to use a porous layer formed of particles as an ink-receiving layer. However, in this method exposed portions of a light-shielding layer are limited because the light-shielding layer is covered with the ink-receiving layer, so that the light-shielding layer scarcely has the function of preventing color mixing. Therefore, this method fails to produce color filters with a good yield.

SUMMARY OF THE INVENTION

It is an object of the present invention to produce a color filter free of color mixing with a good yield and to provide a not-expensive liquid crystal display panel.

The above object can be achieved by the present invention described below.

According to the present invention, there is thus provided a color filter comprising a substrate, a light-shielding layer having apertures provided on the substrate, and a patterned color filter layer formed by coloring an ink-receiving layer within each of the apertures, wherein the ink-receiving layer is composed of a layer of solid particles, and almost the whole top surface of the light-shielding layer is exposed.

According to the present invention, there is also provided a process for producing a color filter, which comprises the steps of forming a light-shielding layer having apertures on a substrate; forming a solid particle layer on or over the whole surface of the substrate; removing the solid particles on the light-shielding layer; and then applying color inks to the solid particle layer remaining within the apertures as an ink-receiving layer so as to provide a predetermined colored pattern, thereby forming a patterned color filter layer.

According to the present invention, there is further provided a liquid crystal display panel comprising a substrate formed with the color filter described above, a panel substrate provided in an opposing relation with the color filter, and a liquid crystal composition enclosed in a space between both substrates.

According to the present invention, the ink-receiving layer is formed by a solid particle layer having an ink-receiving function, and the ink-receiving layer can be substantially formed only within the apertures of the light-shielding layer by physically removing the solid particles on the light-shielding layer, so that the necessity of forming color mixing-preventing walls in the ink-receiving layer is avoided.

DESCRIPTION OF THE PREFERRED EMBODIMENTS

Figure 1:
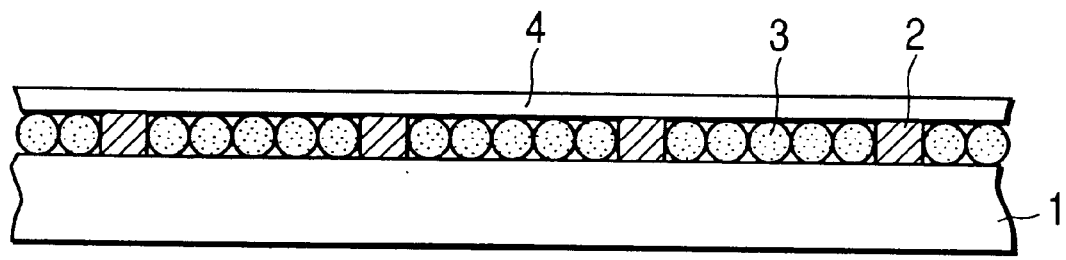
FIG. 1 is a schematic partial cross-sectional view of a color filter according to an embodiment of the present invention.

In FIG. 1, reference numeral 1 indicates a substrate, 2 is a light-shielding layer, and 3 is a patterned color filter layer formed by coloring an ink-receiving layer composed of a solid particle layer. Reference numeral 4 indicates a protective layer.

FIGS. 3A through 3E show a flow diagram illustrating a production process of the above color filter according to an embodiment of the present invention. Incidentally, FIGS. 3A through 3E correspond to the following steps a to e, respectively. In FIGS. 3A through 3E, reference numeral 31 indicates an ink-receiving layer composed of the solid particle layer, 32 is an ink-jet head, 33 is a color ink, and 34 is a buff. The individual steps will be described.

Step a:

The light-shielding layer 2 is formed on the substrate 1. A glass substrate is generally used as the substrate 1. However, a plastic substrate or the like may also be used so far as it does not impair the transparency of the resulting color filter layer and has properties required of the color filter, such as strength. In the case where a reflection type liquid crystal display device is formed, an opaque substrate, on which a reflective member and the like have been provided, may also be used in some cases.

As the light-shielding layer 2, either a black matrix or a black stripe is formed according to a colored pattern. The light-shielding layer 2 preferably has a water-repellent surface. The thickness of the light-shielding layer 2 is preferably from 0.1 to 3 μm. It is composed of a colored resin, metal or metal oxide, or may be a multi-layer film formed of a metal oxide film and a metal film. In the case of the multi-layer film, such a light-shielding layer is formed in such a manner that the metal film comes into contact with the substrate 1. In the case where the light-shielding layer 2 is formed from a resin, it is preferred that carbon black or a pigment be dispersed in the resin. Its thickness is preferably from 0.5 to 3 μm. Preferable examples of the metal used for the light-shielding layer 2 include chromium, zirconium, tantalum and molybdenum, while preferable examples of the metal oxide used include oxides of the above-mentioned metals. In the case of the metal or metal oxide, its thickness is preferably from 0.1 to 1.0 μm.

When the light-shielding layer 2 is made water-repellent, it can be made water-repellent by containing a component having a lipophilic functional group in a resin where the light-shielding layer 2 is formed of the resin, or by keeping the surface of a metal clean where the light-shielding layer 2 is formed of the metal. In any case, the surface of the light-shielding layer 2 can also be made water-repellent by using a coupling agent.

Step b:

The ink-receiving layer 31 composed of the solid particle layer having an ink-receiving function is formed on or over the whole surface of the substrate 1. In the present invention, no limitation is imposed on the morphology and material of solid particles forming the ink-receiving layer. However, an oxide or a synthetic resin may preferably be used. With respect to the morphology thereof, porous particles, hollow particles or hollow particles having a porous shell are preferred from the viewpoint of absorption of color inks. The form of the particles may be spherical, cylindrical or fibrous. However, spherical particles even in particle diameter are preferred because a uniform particle layer with the solid particles regularly arranged can be formed on the substrate. As the material for the solid particles, an inorganic compound such as $SiO_2$, $TiO_2$, $ZrO_2$ or SiC, or a synthetic resin such as polystyrene may be preferably used.

In the present invention, a printing process, a spin coating process, an on-water surface developing process, a slit coating process, a spray coating process, a spreading process or the like may be suitably selected as a process for forming the ink-receiving layer 31.

A process particularly preferably used in the present invention is the on-water surface developing process which process comprises the steps of spreading a dispersion obtained by dispersing solid particles surface-treated with a compound capable of forming a binder in a dispersing medium on a developing liquid which has a specific gravity higher than the dispersing medium and is not compatible with the dispersing medium, removing the dispersing medium from the dispersion, thereby arranging the solid particles on the developing liquid to form the solid particle layer, and then transferring the solid particle layer to a substrate on which a light-shielding layer has been formed. In this on-water surface developing process, the substrate may be immersed in the developing liquid in advance and gradually pulled up from the developing liquid after the dispersion has been spread. A horizontal pressure may be applied to the solid particles on the surface of the developing liquid to keep them in a close state. The pressure at this time is preferably from 5 to 35 $mN/m^2$.

In this process, examples of the compound capable of forming the binder include organosilicone compounds represented by the general formula

$$R_nSi(OR')_{4-n} \qquad (1)$$

wherein R and R' may be the same or different from each other and are independently hydrogen, an alkyl group having 1 to 8 carbon atoms, an aryl group or a vinyl group, and n is an integer of 0 to 3.

Specific examples of the organosilicone compounds include tetramethoxysilane, tetraethoxysilane, tetraisopropoxysilane, tetraoctyloxysilane, methyltrimethoxysilane, methyltriethoxysilane, ethyltriethoxy-silane, methyltriisopropoxysilane, dimethyldimethoxy-silane, methyltributoxysilane, octyltriethoxysilane, phenyltrimethoxysilane, vinyltrimethoxysilane, diethoxysilane and triethoxysilane.

Besides the above-mentioned organosilicone compounds, β-diketone compounds such as dibutoxybisacetylacetonatozirconium, tributoxymonoacetylacetonatozirconium and dibutoxybisacetylacetonatotitanium, and carboxylic acid metal salts such as tin octanoate, aluminum octanoate and tin laurate may also be used as the compounds capable of forming a binder. Polysilazane may also be preferably used in that it has high reactivity to the solid particles.

In this process, the surface treatment of the solid particles with the compound capable of forming a binder is conducted by such a process as described below.

a) A process comprising the steps of adding such a compound capable of forming a binder as described above to a dispersion obtained by dispersing the solid particles in a proper dispersing medium, for example, an organic solvent such as an alcohol, and then reacting the compound capable of forming a binder with the solid particles at a temperature not higher than the boiling point of the dispersing medium.

b) A process comprising the step of dispersing the solid particles in a dispersing medium containing the compound capable of forming a binder.

c) In the case where dispersion of the solid particles is a colloidal particle dispersion such as silica sol, a process comprising the step of adding the compound capable of forming a binder to the colloidal particle dispersion directly or after the dispersing medium is replaced by an organic solvent.

In this process, the dispersion obtained upon the surface treatment of the solid particles with the compound capable of forming a binder by such a treating process as described above may be used as it is, thereby spreading it to form the solid particle layer. However, it is preferred that the dispersing medium be replaced by an ketone, ether or aromatic type organic solvent from the viewpoints of dispersibility of the solid particles, the volatility and evaporating ability of the dispersing medium after the dispersion has been spread, and the like.

Specific examples of the organic solvent suitable for the spreading include methyl ethyl ketone, methyl isobutyl ketone, cyclohexane, dimethyl ether, diethyl ether, hexane, octane, toluene and xylene.

As the developing liquid, a liquid which has a specific gravity higher than the dispersing medium and is not compatible with the dispersing medium is used. Specifically, water is preferably used from the viewpoint of easy handling.

The dispersion of the solid particles is spread on the developing liquid, the dispersing medium in the dispersion is removed by volatilization, evaporation or the like, and the solid particle layer formed on the developing liquid is then transferred to the substrate 1. Thereafter, the solid particle layer is dried, and baked as needed, whereby the solid particles are bonded to one another by the binder, and moreover the binder bonds to the substrate 1 to provide an ink-receiving layer high in adhesion to the substrate 1.

In the present invention, the average particle diameter of the solid particles is preferably from 0.05 to 5 µm, more preferably from 0.05 to 3 µm. When the ink-receiving layer 31 is formed in a single-layer structure composed of the solid particle layer, the average particle diameter of the solid particles is preferably controlled to 60 to 120% of the film thickness of the light-shielding layer 2. In the present invention, the ink-receiving layer 31 is formed in a multilayer structure composed of at least two layers of the solid particles as described below, whereby color irregularity in individual filter elements can be reduced. Incidentally, with respect to the particle diameter of the solid particles, the average and distribution have been confirmed by the laser scattering method in the present invention.

Step c:

The solid particles on the light-shielding layer 2 are removed in such a manner that the solid particles are retained only within the apertures of the light-shielding layer 2. No particular limitation is imposed on the means for removing the solid particles on the light-shielding layer 2. It is however preferred to use a means, for example, polishing or the like, since a flat surface aligned with the surface of the light-shielding layer 2 can be formed. More specifically, a means in which a rotating buff is pressed against the solid particles while pouring water, a method in which the substrate is moved while pressing a squeegee against the solid particles, or the like is used. In this embodiment, the case where a buff 34 is used to remove the solid particles is illustrated.

The solid particles on the light-shielding layer 2 are removed upon the formation of the ink-receiving layer 31, whereby almost the whole top surface of the light-screening layer 2 is exposed. In the present invention, it is desirable that no solid particle be retained on the light-shielding layer 2. However, the effects on the prevention of color mixing, and the like are brought about so far as at least 90%, desirably at least 95% of the light-shielding layer 2 is exposed.

Step d:

Proper amounts of color inks 33 are applied to the ink-receiving layer 31, which is composed of the solid particle layer arranged in the state embedded in the apertures of the light-shielding layer 2, according to a predetermined colored pattern (usually composed of red, green and blue colors) by an ink-jet system. The color inks applied are held in the interiors of the solid particles and between the solid particles. The water or solvent in the color inks are volatilized off by optionally conducting a drying treatment or the like to obtain the patterned color filter layer 3. Since almost the whole top surface of the light-shielding layer 2 is exposed, the light-shielding layer 2 can function as an ink-repellent layer to prevent color mixing between adjacent filter elements.

Step e:

In the present invention, it is preferred that the surface of the color filter layer 3 be substantially lower than the top surface of the light-shielding layer 2. The surface of the color filter layer 3 lower than the top surface of the light-shielding layer 2 permits the provision of a high-quality liquid crystal display panel which is high in flatness and scarcely undergoes disordered alignment upon the formation of the panel. At the same time, the solid particles on the light-shielding layer 2 can also be removed with ease in the production process of the color filter.

As the ink-jet system used in the present invention, a bubble-jet type system making use of an electrothermal converter as an energy-generating element, a piezo-jet type system making use of a piezoelectric element, or the like may be used.

As the color inks 33 used in the present invention, either dye-based inks or pigment-based inks may be used. As a medium dissolving or dispersing these dyes or pigments therein, water and/or an organic solvent may be used as needed.

As illustrated in FIG. 1, the protective layer 4 is formed on the surface as needed. As the protective layer, there may be used a resin composition layer of the photo-setting type, thermosetting type or light- and heat-curing type, or an inorganic film formed by vacuum deposition, sputtering or the like. However, in each case, any material may be used so far as it has sufficient transparency to be used in the color filter and withstands subsequent processes such as an ITO film (electrode layer) forming process.

Figure 2:
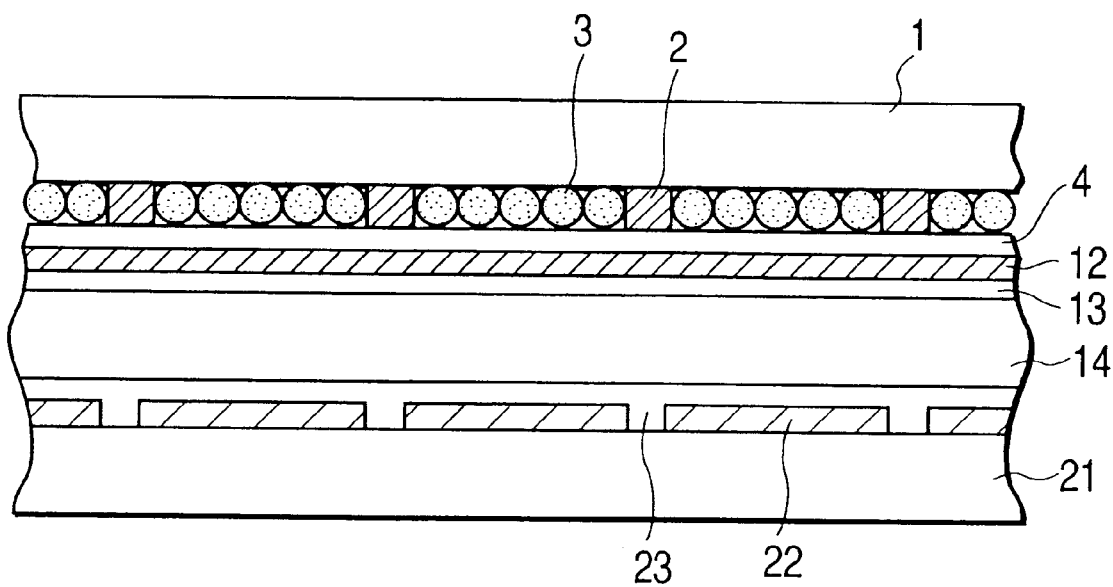
FIG. 2 is a schematic partial cross-sectional view of a liquid crystal display panel according to an embodiment of the present invention.
Figure 3A:
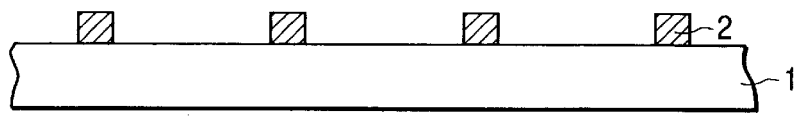
FIGS. 3A, 3B, 3C, 3D and 3E are a flow diagram illustrating a production process of the color filter according to the embodiment of the present invention.
Figure 3B:
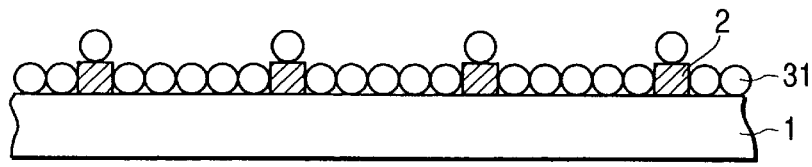
Figure 3C:
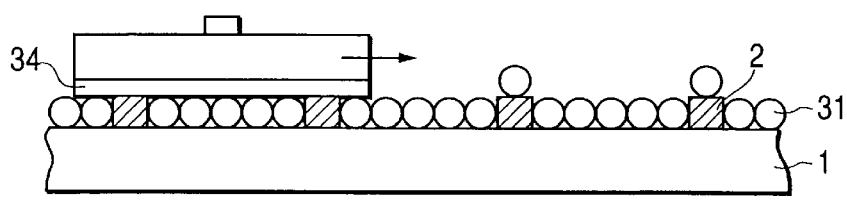
Figure 3D:
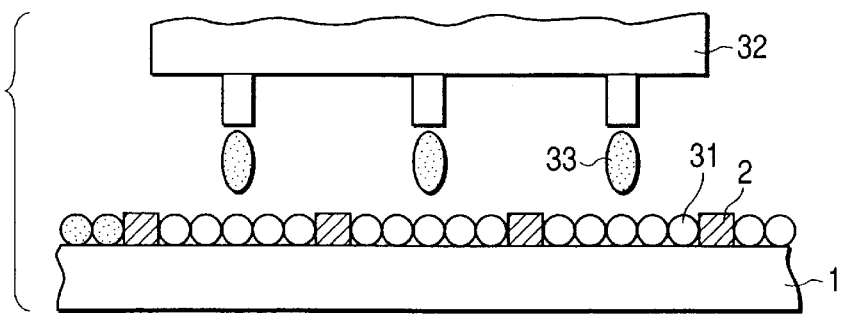
Figure 3E:
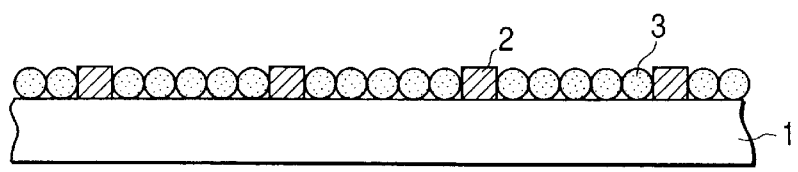

FIG. 2 illustrates a TFT color liquid crystal display panel in which the color filter according to this embodiment has been incorporated. In FIG. 2, reference numeral 12 designates a common electrode, 13 is an alignment film, 21 is a panel substrate, 22 is a pixel electrode, 23 is an alignment film, and 14 is a liquid crystal compound.

The color liquid crystal display panel is generally formed by uniting the color filter and the panel substrate 21 and enclosing the liquid crystal compound 14 in a space between them. TFT (not illustrated) and the transparent pixel electrodes 22 are formed in the form of a matrix on the inside of one substrate 21 of the liquid crystal display panel. On the inside of the other substrate 1, colored portions of the color filter are provided in such a manner that color elements of R (red), G (green) and B (blue) are arranged at positions opposite to the pixel electrodes 22. The transparent common electrode 12 is formed over the whole surface of the color filter. The black matrices 2 are generally formed on the side of the color filter, but formed on the side of the TFT substrate opposite to the color filter in a liquid crystal display panel of the black matrix (BM) on array type. The alignment films 13 and 23 are further formed on the respective insides of both substrates. Liquid crystal molecules can be aligned or oriented in a fixed direction by subjecting these films to a rubbing treatment. These substrates are oppositely arranged through a spacer (not illustrated) and bonded to each other with a sealing material (not illustrated), and the liquid crystal compound 14 is charged in a space between them. Reference numerals 3 and 4 in FIG. 2 have the same meaning as in FIG. 1.

Polarizing films (not illustrated) are bonded to the outer surfaces of the respective substrates of the liquid crystal display panel. The liquid crystal compound functions as an optical shutter for changing the transmittance of light from a back light generally composed of a combination of a fluorescent lamp and a scattering plate (both, not illustrated), thereby making a display.

Figure 4:
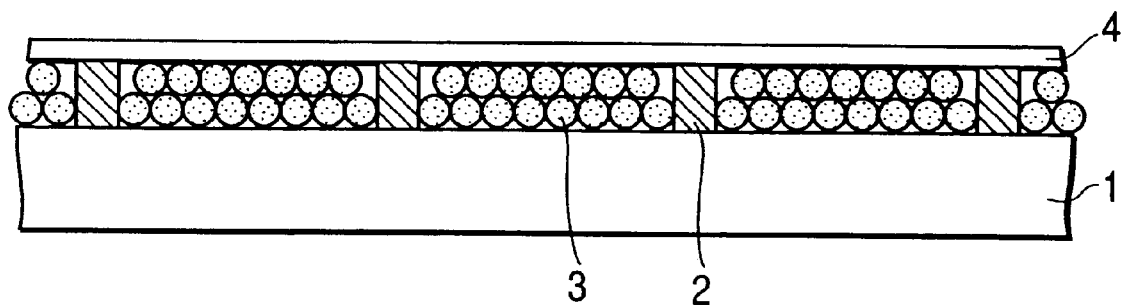
FIG. 4 is a schematic partial cross-sectional view of a color filter according to another embodiment of the present invention.
Figure 5:
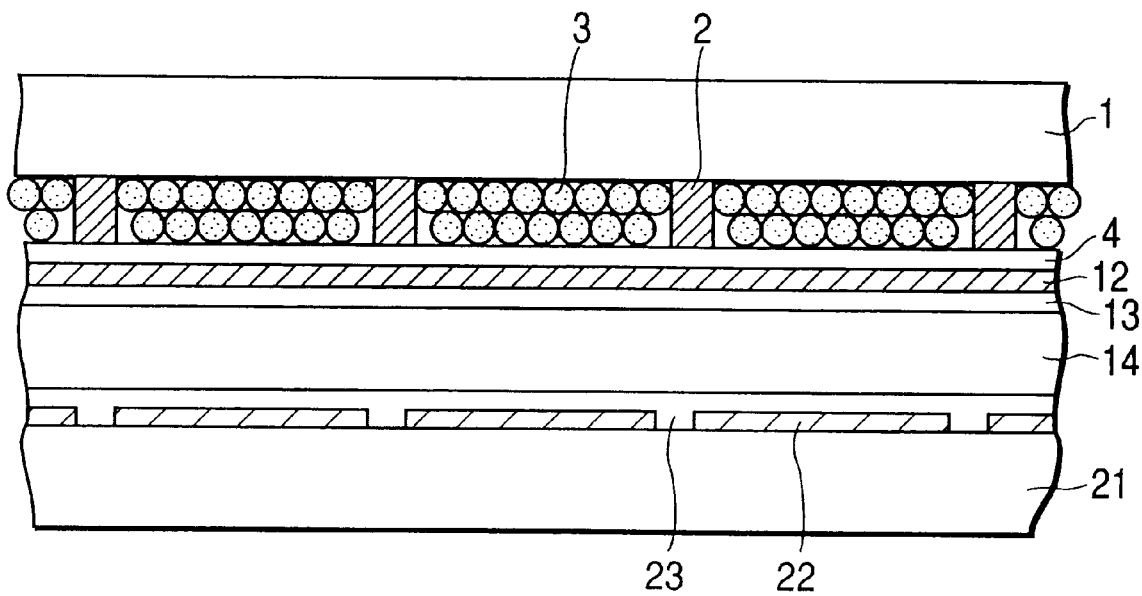
FIG. 5 is a schematic partial cross-sectional view of a liquid crystal display panel using the color filter of FIG. 4.
Figure 6A:
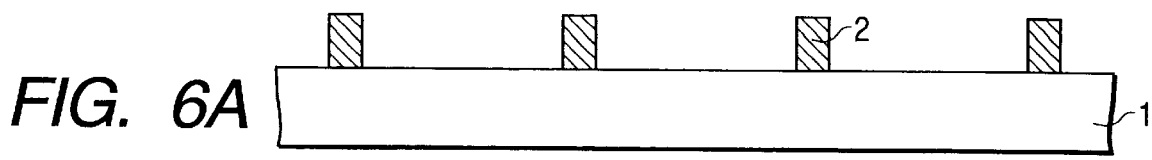
FIGS. 6A, 6B, 6C, 6D and 6E are a flow diagram illustrating the production of the color filter of FIG. 4.
Figure 6B:
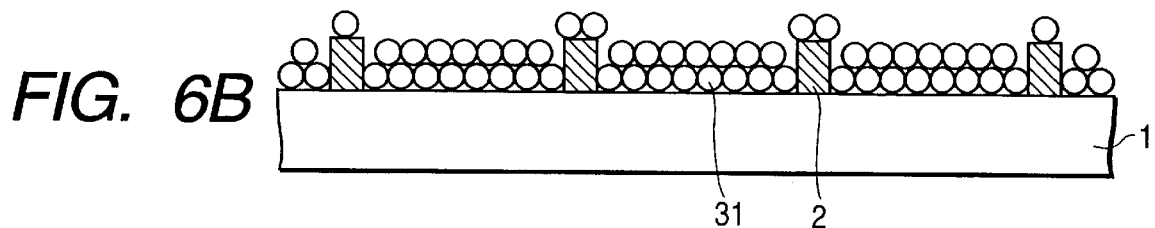
Figure 6C:
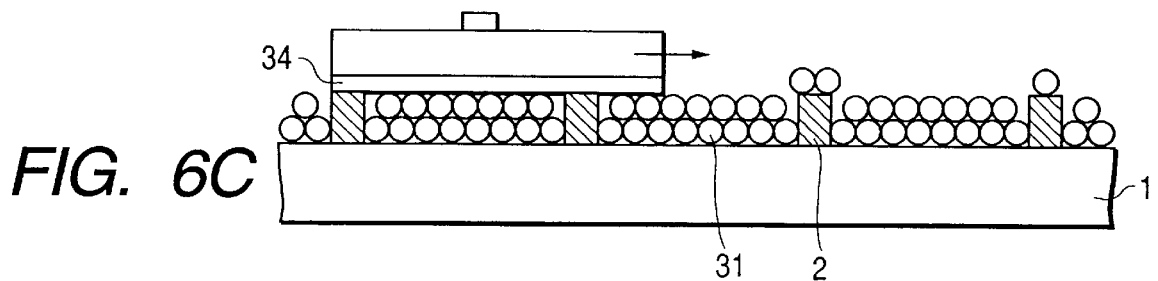
Figure 6D:
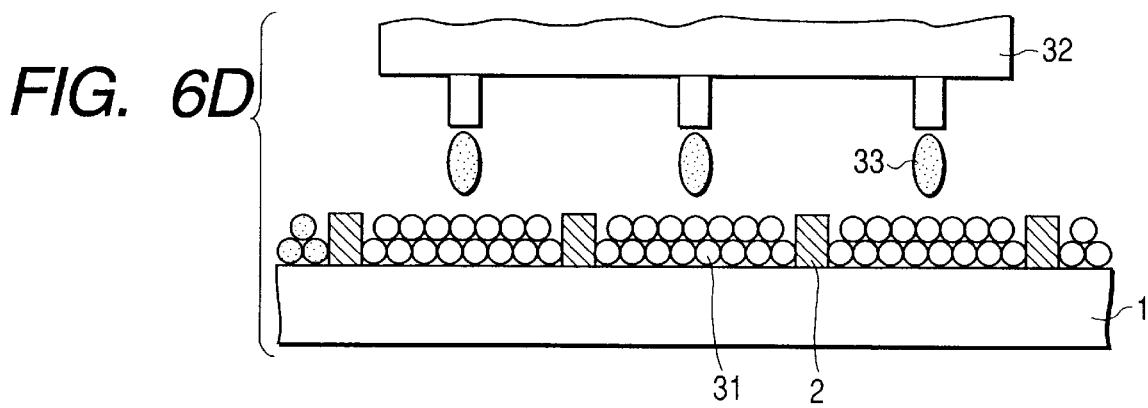
Figure 6E:
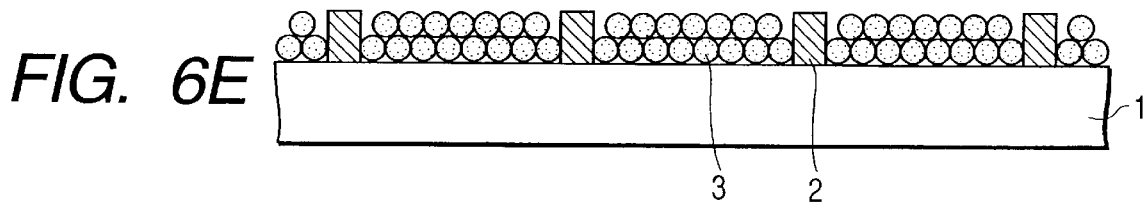
Figure 7:
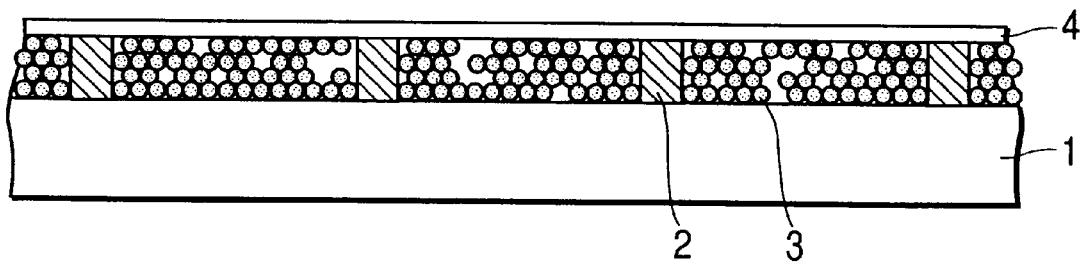
FIG. 7 is a schematic partial cross-sectional view of a color filter according to a further embodiment of the present invention.
Figure 8:
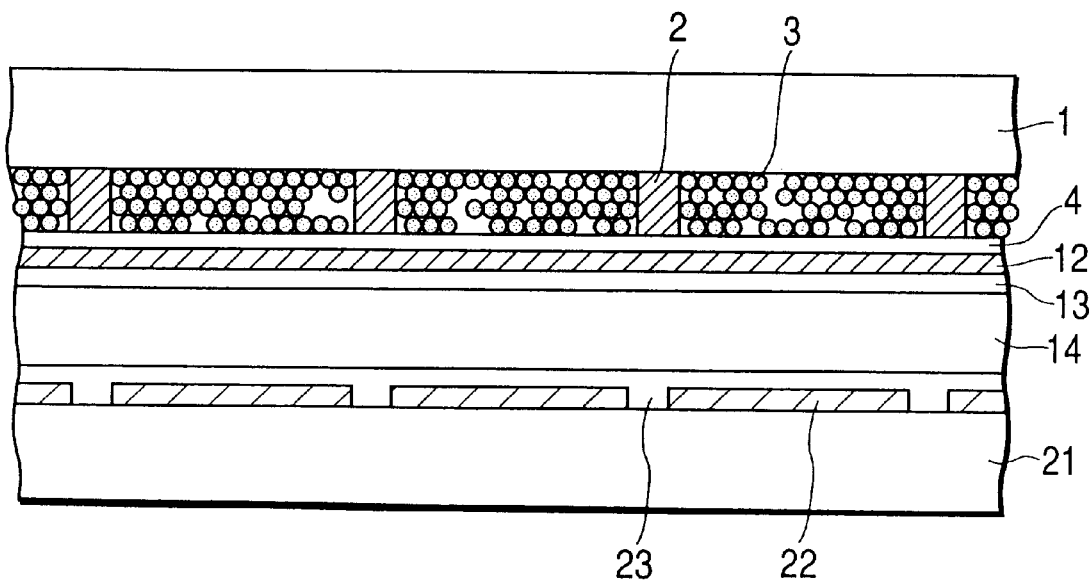
FIG. 8 is a schematic partial cross-sectional view of a liquid crystal display panel using the color filter of FIG. 7.

As other embodiments of the present invention, an embodiment (FIGS. 4, 5, 6A through 6E), in which the solid particle layer serving as the color filter layer is formed in a 2-layer structure, and another embodiment (FIGS. 7, 8, 9A through 9E), in which the solid particle layer is formed in a random multi-layer structure, will hereinafter be described. FIGS. 4 and 7 are schematic partial cross-sectional views of color filters according to the respective embodiments. FIGS. 5 and 8 are schematic partial cross-sectional views of liquid crystal display panels fabricated by using the color filters of FIGS. 4 and 7, respectively. FIGS. 6A through 6E and FIGS. 9A through 9E are flow diagrams illustrating the production of the color filters according to the respective embodiments. In each figure, the same members as those in FIGS. 1, 2, 3A through 3E are indicated by the like reference numerals, and their descriptions are omitted.

In the present invention, the production process of color filters, in which an ink-receiving layer is composed of a solid particle layer of a multi-layer structure, is basically the same as the case of the single-layer structure described above. When only a solid particle layer of a single-layer structure can be obtained by one process like the on-water surface developing process previously described in the embodiment of the singly-layer structure, however, this process is repeated to pile up solid particle layers of the single-layer structure on each other, whereby the solid particle layer can be made a multi-layer structure.

Figure 9A:
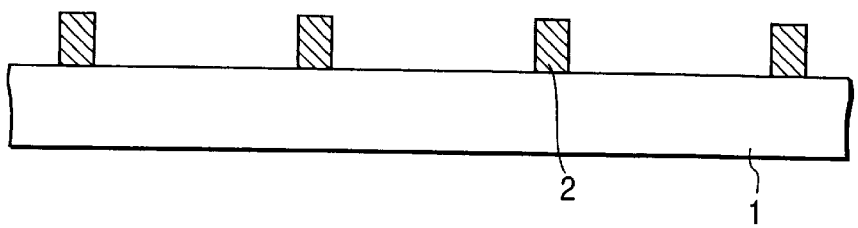
FIGS. 9A, 9B, 9C, 9D and 9E are a flow diagram illustrating the production of the color filter of FIG. 7.
Figure 9B:
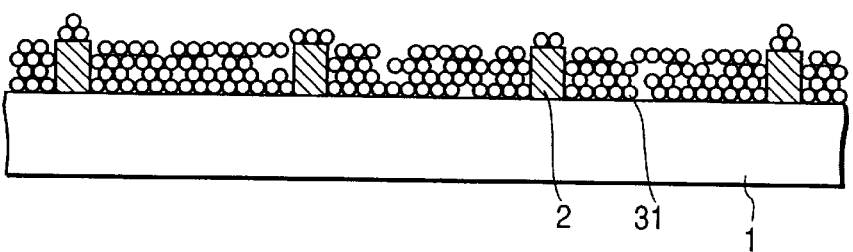
Figure 9C:
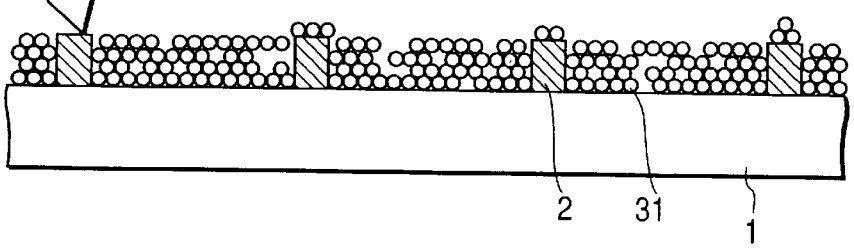
Figure 9D:
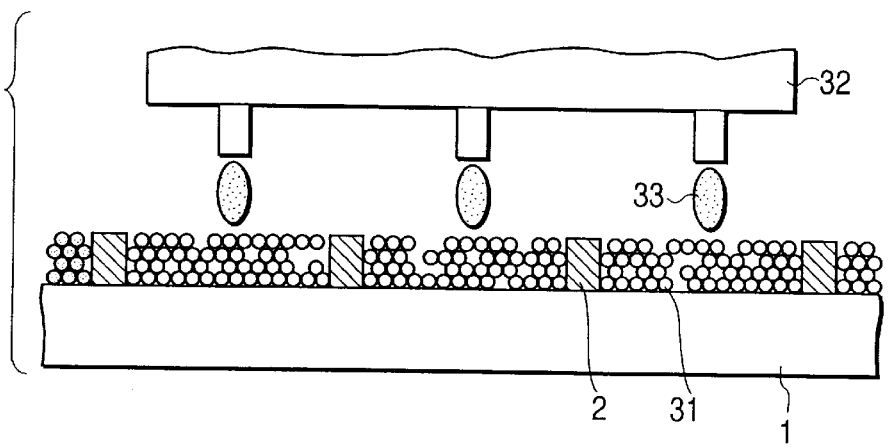
Figure 9E:
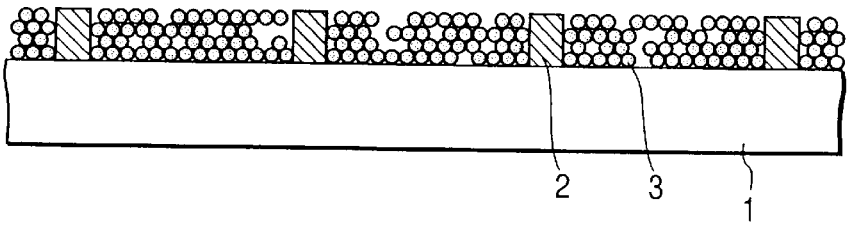

FIG. 9C illustrates the state that a squeegee 35 is used as another means for removing the solid particles on the light-shielding layer 2.

When the solid particle layer is made a multi-layer structure as illustrated in these embodiments, color irregularity in individual filter elements can be reduced.

Although the TFT type liquid crystal display panels have been described in the above embodiments. However, the present invention is not limited to this type, and is also preferably applied to liquid crystal display panels of other drive types such as the simple matrix type.

In the liquid crystal display panels according to the present invention, the conventional techniques may be applied to other members than a color filter as they are, so far as the panels are fabricated by using the color filter according to the present invention. Accordingly, with respect to the liquid crystal compound also, a commonly used TN type liquid crystal or ferroelectric liquid crystal, or the like may be used.

The present invention will hereinafter be described in more detail by the following Examples.

EXAMPLE 1

A glass substrate having a thickness of 0.7 mm was used as a substrate, and a black matrix having a thickness of about 0.17 μm with apertures was formed as a light-shielding layer by forming a laminate of a (metallic) chromium film and a chromium oxide film on the substrate.

Porous particles composed mainly of $SiO_2$ having an average particle diameter of about 0.17 μm were used as solid particles and dispersed in isopropanol. Tetraethoxysilane was added to this dispersion, and the mixture was heated to 50° C. for 1 hour to obtain an introduction of binder for the solid particles.

The dispersing medium in the thus-obtained dispersion was replaced by cyclohexane. Water was used as a developing liquid to spread the thus-treated dispersion on the developing liquid. The cyclohexane was volatilized to obtained the solid particle layer. This solid particle layer was transferred to the glass substrate on which the black matrix had been formed. The transferred solid particle layer was subjected to a heat treatment at 150° C. for 10 minutes, thereby bonding the solid particles to the glass substrate, and to one another by a binder.

After the solid particles on the black matrix was removed by a squeegee, color inks of R (red), G (green) and B (blue) colors were applied to the solid particles remaining within the apertures of the black matrix according to a predetermined colored pattern. Then, a drying treatment was conducted at 230° C. for 10 minutes to obtain colored particles, i.e., a patterned color filter.

The thus-obtained color filter was observed through an optical microscope. As a result, it was confirmed that the color filter is free of color mixing between adjacent filter elements and hence a good color filter.

EXAMPLE 2

A color filter was produced in the same manner as in Example 1 except that solid particles having an average particle diameter of 0.2 μm were used. As a result, a good color filter was obtained like Example 1.

EXAMPLE 3

A glass substrate having a thickness of 0.7 mm was used as a substrate, and a black matrix having a thickness of 1 μm with apertures, composed of a resin composition, was formed as a light-shielding layer on the substrate.

Hollow solid particles having a porous shell and an average particle diameter of 1 μm and composed mainly of $SiO_2$ were used as solid particles to prepare a colloidal particle dispersion. After the dispersing medium in the thus-prepared colloidal dispersion was replaced by xylene, polysilazane was added as a binder to obtain a dispersion of the solid particles containing the binder.

The dispersing medium in the thus-obtained dispersion was replaced by methyl ethyl ketone. Water was used as a developing liquid to spread the thus-treated dispersion on the developing liquid. The methyl ethyl ketone was volatilized to obtained the solid particle layer. This solid particle layer was transferred to the glass substrate on which the black matrix had been formed. The transferred solid particle layer was subjected to a heat treatment at 150° C. for 10 minutes, thereby bonding the solid particles to the glass substrate, and to one another by the binder.

A rotating buff was pressed against the solid particle layer while pouring water to remove the solid particles on the black matrix and at another part than an effective display part among the solid particles transferred to the whole surface of the substrate.

Color inks of R, G and B colors were applied to the solid particles remaining within the apertures of the black matrix according to a predetermined colored pattern. Then, a drying treatment was conducted at 230° C. for 10 minutes to obtain colored particles, i.e., a patterned color filter.

The thus-obtained color filter was observed through an optical microscope. As a result, it was confirmed that the color filter is free of color mixing between adjacent filter elements and hence a good color filter.

EXAMPLE 4

A glass substrate having a thickness of 0.7 mm was used as a substrate, and a black matrix having a thickness of about 0.17 µm with apertures was formed as a light-shielding layer by forming a laminate of a (metallic) chromium film and a chromium oxide film on the substrate.

Porous particles composed mainly of $SiO_2$ having an average particle diameter of about 0.17 µm were used as solid particles to prepare a colloidal particle dispersion. After the dispersing medium in the thus-prepared colloidal dispersion was replaced by xylene, polysilazane was added as a binder to obtain a dispersion of the solid particles containing the binder.

Water was used as a developing liquid, and the glass substrate on which the black matrix had been formed was immersed in the developing liquid in advance. After the dispersing medium in the thus-obtained dispersion was replaced by methyl ethyl ketone, the thus-treated dispersion was spread on the developing liquid. The methyl ethyl ketone was volatilized to obtained the solid particle layer. The glass substrate on which the black matrix had been formed was gradually pulled up from the developing liquid to transfer the solid particle layer to the glass substrate. The transferred solid particle layer was subjected to a heat treatment at 150° C. for 10 minutes, thereby bonding the solid particles to the glass substrate, and to one another by the binder.

A rotating buff was pressed against the solid particle layer while pouring water to remove the solid particles on the black matrix and at another part than an effective display part among the solid particles transferred to the whole surface of the substrate.

Color inks of R, G and B colors were applied to the solid particles remaining within the apertures of the black matrix according to a predetermined colored pattern. Then, a drying treatment was conducted at 230° C. for 10 minutes to obtain colored particles, i.e., a patterned color filter.

The thus-obtained color filter was observed through an optical microscope. As a result, it was confirmed that the color filter is free of color mixing between adjacent filter elements and hence a good color filter.

EXAMPLE 5

A glass substrate having a thickness of 0.7 mm was used as a substrate, and a black matrix having a thickness of about 0.17 µm with apertures was formed as a light-shielding layer by forming a laminate of a (metallic) chromium film and a chromium oxide film on the substrate.

Porous particles composed mainly of $SiO_2$ having an average particle diameter of about 0.17 µm were used as solid particles to prepare a colloidal particle dispersion. After the dispersing medium in the thus-prepared colloidal dispersion was replaced by xylene, polysilazane was added as a binder to obtain a dispersion of the solid particles containing the binder.

Water was used as a developing liquid, and the glass substrate on which the black matrix had been formed was immersed in the developing liquid in advance. After the dispersing medium in the thus-obtained dispersion was replaced by methyl ethyl ketone, the thus-treated dispersion was spread on the developing liquid. At this time, a pressure of 20 $mN/m^2$ was applied to the solid particles from lateral directions in such a manner that the solid particles were closely distributed.

Thereafter, the methyl ethyl ketone was volatilized to obtained the solid particle layer. The glass substrate on which the black matrix had been formed was gradually pulled up from the developing liquid to transfer the solid particle layer to the glass substrate. The transferred solid particle layer was subjected to a heat treatment at 150° C. for 10 minutes, thereby bonding the solid particles to the glass substrate, and to one another by the binder.

A rotating buff was pressed against the solid particle layer while pouring water to remove the solid particles on the black matrix and at another part than an effective display part among the solid particles transferred to the whole surface of the substrate.

Color inks of R, G and B colors were applied to the solid particles remaining within the apertures of the black matrix according to a predetermined colored pattern. Then, a drying treatment was conducted at 230° C. for 10 minutes to obtain colored particles, i.e., a patterned color filter.

The thus-obtained color filter was observed through an optical microscope. As a result, it was confirmed that the color filter is free of color mixing between adjacent filter elements and hence a good color filter.

According to the present invention, as described above, liquid crystal display panels free of color mixing can be produced at a low cost. Since the color filters according to the present invention are free from surface irregularities caused by overlapping of color filter layers and gaps therebetween, which have occurred in the conventional pigment dispersing process, the alignment or orientation of a liquid crystal in a liquid crystal display panel using such a color filter becomes better, and so liquid crystal display panels capable of displaying color images high in display quality can be provided at a low cost.

What is claimed is:

1. A color filter comprising a substrate, a light-shielding layer having apertures provided on the substrate, and a patterned color filter layer formed by coloring an ink-receiving layer within each of the apertures, wherein the ink-receiving layer is composed of a solid particle layer, and almost the whole top surface of the light-shielding layer is exposed.

2. The color filter according to claim 1, wherein the solid particles are porous.

3. The color filter according to claim 1, wherein the solid particles are hollow.

4. The color filter according to claim 1, wherein the solid particle layer is a single layer.

5. The color filter according to claim 1, wherein the solid particle layer is of a multi-layer structure composed of at least two layers.

6. The color filter according to claim 1, wherein the solid particles are particles of an inorganic compound.

7. The color filter according to claim 1, which further comprises, on the color filter layer and the light-shielding layer, a protective layer formed so as to come into contact with both layers.

8. The color filter according to claim 1, which further comprises, on the color filter layer and the light-shielding layer, an electrode layer formed so as to come into contact with both layers.

9. A process for producing a color filter, which comprises the steps of:

forming a light-shielding layer having apertures on a substrate;

forming a solid particle layer on or over the whole surface of the substrate;

removing the solid particles on the light-shielding layer; and then applying color inks to the solid particle layer remaining within the apertures as an ink-receiving layer so as to provide a predetermined colored pattern, thereby forming a patterned color filter layer.

10. The production process according to claim 9, wherein the solid particle layer is a single layer.

11. The production process according to claim 10, wherein the step of forming the solid particle layer comprises the steps of:

spreading a dispersion obtained by dispersing solid particles surface-treated with a compound capable of forming a binder in a dispersing medium on a developing liquid which has a specific gravity higher than the dispersing medium and is not compatible with the dispersing medium, removing the dispersing medium from the dispersion, thereby arranging the solid particles on the developing liquid to form the solid particle layer, and then transferring the solid particle layer to the substrate on which the light-shielding layer has been formed.

12. The production process according to claim 11, wherein the substrate is immersed in the developing liquid in advance and then the substrate is gradually pulled up from the developing liquid after the dispersion has been spread to transfer the solid particle layer to the substrate.

13. The production process according to claim 9, wherein the solid particle layer is of a multi-layer structure composed of at least two layers.

14. The production process according to claim 13, wherein the step of forming the solid particle layer comprises repeating plural times steps of:

spreading a dispersion obtained by dispersing solid particles surface-treated with a compound capable of forming a binder in a dispersing medium on a developing liquid which has a specific gravity higher than the dispersing medium and is not compatible with the dispersing medium;

removing the dispersing medium from the dispersion, thereby arranging the solid particles on the developing liquid to form the solid particle layer; and then transferring the solid particle layer to the substrate on which the light-shielding layer has been formed.

15. A liquid crystal display panel comprising a substrate formed with the color filter according to any one of claims 1 to 8, a panel substrate provided in an opposing relation with the color filter, and a liquid crystal composition enclosed in a space between both substrates.

16. The production process according to any one of claims 9–14, wherein the solid particles are removed by pressing a squeegee.

17. The production process according to any one of claims 9–14, wherein the solid particles are removed using a rotating buff.

* * * * *